US008958944B2

(12) United States Patent
Jung et al.

(10) Patent No.: US 8,958,944 B2
(45) Date of Patent: Feb. 17, 2015

(54) METHOD FOR CONTROLLING CREEP TORQUE OF A VEHICLE

(75) Inventors: Jae Won Jung, Gyeonggi-do (KR); Soon Woo Kwon, Gyeonggi-do (KR); Kyu Il Lee, Gyeonggi-do (KR); Sung Jin Chung, Gyeonggi-do (KR); Sung Gone Yoon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 469 days.

(21) Appl. No.: 13/165,146

(22) Filed: Jun. 21, 2011

(65) Prior Publication Data
US 2012/0150384 A1    Jun. 14, 2012

(30) Foreign Application Priority Data

Dec. 8, 2010  (KR) .................. 10-2010-0125005

(51) Int. Cl.
*F16H 61/20*     (2006.01)
*G06F 19/00*     (2011.01)
(Continued)

(52) U.S. Cl.
CPC ... *B60W 30/18118* (2013.01); *B60W 30/18063* (2013.01); *B60W 50/0205* (2013.01); *B60W 50/029* (2013.01); *B60W 50/14* (2013.01); *B60L 3/0038* (2013.01); *B60L 3/08* (2013.01); *B60L 15/2063* (2013.01); *B60W 2520/10* (2013.01); *B60W 2520/105* (2013.01); *B60W 2540/12* (2013.01); *B60W 2550/142* (2013.01); *B60W 2710/0666* (2013.01); *Y02T 10/7258* (2013.01); *B60L 2240/12* (2013.01);
(Continued)

(58) Field of Classification Search
CPC  B60W 10/08; B60W 10/06; B60W 30/18118
USPC ................... 701/31.1, 63, 70, 79; 152/66, 68; 477/92, 93
See application file for complete search history.

(56) References Cited

U.S. PATENT DOCUMENTS

2003/0171186 A1*  9/2003  Okada et al. ..................... 477/71
2005/0004750 A1*  1/2005  Huddle ........................... 701/200

(Continued)

FOREIGN PATENT DOCUMENTS

JP    2000009157 A    1/2000
JP    2001-310654 A    11/2001

(Continued)

*Primary Examiner* — John Q Nguyen
*Assistant Examiner* — Rodney P King
(74) *Attorney, Agent, or Firm* — Mintz Levin Cohn Ferris Glovsky and Popeo, P.C.; Peter F. Corless

(57) ABSTRACT

The present invention provides a technique for controlling creep torque to prevent a vehicle from rolling backward on an upward slope. In particular, a gradient of a road is calculated in real time from a detection value of a sensor and vehicle acceleration. A maximum creep torque for preventing rollback caused by gravity according to the gradient is calculated using the gradient and vehicle information. A first creep torque reference is calculated based on the maximum creep torque and the vehicle speed. A second creep torque reference is calculated based on the maximum creep torque and the vehicle acceleration. A torque command value according to an operation state of a brake is calculated based on the first creep torque reference value and the second creep torque reference value and the gradient. In response, a torque output of a driving motor is controlled according to the calculated torque command value.

8 Claims, 6 Drawing Sheets

(51) Int. Cl.
- *B60W 30/18* (2012.01)
- *B60W 50/02* (2012.01)
- *B60W 50/029* (2012.01)
- *B60W 50/14* (2012.01)
- *B60L 3/00* (2006.01)
- *B60L 3/08* (2006.01)
- *B60L 15/20* (2006.01)

(52) U.S. Cl.
CPC ....... *B60L 2240/14* (2013.01); *B60L 2240/423* (2013.01); *B60L 2240/642* (2013.01); *B60L 2260/44* (2013.01); *Y02T 90/16* (2013.01); *Y02T 10/642* (2013.01)
USPC .............................. 701/31.1; 477/92; 477/93

(56) References Cited

U.S. PATENT DOCUMENTS

| | | | |
|---|---|---|---|
| 2005/0225170 A1* | 10/2005 | Tsunehara | 303/155 |
| 2009/0240411 A1* | 9/2009 | Amamiya et al. | 701/70 |
| 2010/0235043 A1* | 9/2010 | Seta et al. | 701/34 |

FOREIGN PATENT DOCUMENTS

| | | |
|---|---|---|
| JP | 2003070107 A | 3/2003 |
| JP | 2003262240 A | 9/2003 |
| JP | 2004320850 A | 11/2004 |
| JP | 2006-050811 A | 2/2006 |
| JP | 2007-185070 A | 7/2007 |
| KR | 10-2001-0057657 | 7/2001 |
| KR | 10-0783904 | 12/2007 |

* cited by examiner

METHOD FOR CONTROLLING CREEP TORQUE OF A VEHICLE

CROSS-REFERENCE TO RELATED APPLICATION

This application claims under 35 U.S.C. §119(a) the benefit of Korean Patent Application No. 10-2010-0125005 filed Dec. 8, 2010, the entire contents of which are incorporated herein by reference.

BACKGROUND (a) Technical Field

The present invention relates to a system and method for controlling creep torque of an electric vehicle. More particularly, it relates to a method for controlling creep torque, which can efficiently prevent initial slope rolling-back of a vehicle using an electric motor as a driving source.

(b) Background Art

Today, vehicles using fossil fuel-combusting gasoline and diesel engines have various environmental contamination limitations due to exhaust gases, global warming due to $CO_2$, respiratory ailments due to ozone generation, and fuel resource depletion.

In order to help prevent these effects, eco-friendly electric vehicles including pure electric vehicles (EV) (vehicles using a battery as a power source and a driving motor as a driving source), hybrid electric vehicles (HEV) (vehicles using an engine and a driving motor as driving sources), and fuel cell electric vehicles (FCEV) (vehicles using a fuel cell as a power source and a driving motor as a driving source) have been developed.

In a typical gasoline engine vehicle, since an idle torque of an engine is delivered to a torque converter and a transmitter even when an accelerator pedal or a brake pedal is not depressed, the vehicle can creep forward at a low speed even when the driver is not pressing the accelerator pedal.

As shown in FIG. 5, a vehicle ascending a slope undergoes a slope resistance of mg sin θ as well as a rolling resistance. Due to the slope resistance, the vehicle may stop at the slope by a frictional braking force according to the operation of a brake pedal. Thereafter, if a driver releases the brake pedal, the vehicle may in this instance move backward. In this case, the driver may prevent the vehicle from rolling backwards by stepping on the brake pedal or the accelerator pedal.

In order to avoid performing such operations for preventing a vehicle from rolling backward on an upward slope, creep control technologies have been introduced. In these cases, creep control technologies may prevent the rolling-back of a vehicle even when an accelerator pedal or a brake pedal is not depressed, and may switch the vehicle into a normal driving state when a driver steps on the accelerator pedal. This is done by allowing the idle torque of an engine to be delivered to a torque converter and a transmitter when it is detected that the vehicle is on a hill.

Since electric vehicles operate using only a motor driving system (i.e., a motor, a decelerator, and a wheel) without a separate engine, idle torque from the motor does not automatically occur when the electric vehicle stops. Accordingly, creeping like in a gasoline engine vehicle can not occur.

Accordingly, a creep function to simulate creeping (i.e., like those vehicles having a gasoline engine) has to be implemented in electric vehicles through motor torque control.

In other words, pure electric vehicles, including fuel cell vehicles, require a creep control algorithm for generating a torque similar to an engine idle torque to provide a driving feeling similar to that of typical gasoline vehicles. Many studies are being conducted to develop creep control algorithms for improving a driving feeling and preventing a vehicle from rolling back when it restarts from a halt state on an upward slope.

For example, in a vehicle driven by only a motor like an electric vehicle or a fuel cell vehicle, rolling-back on an upward slope may be prevented by controlling a motor driving force without an additional system (e.g., by recognizing an upward slope and increasing a motor driving torque).

That is, as shown in FIG. 6, fuel cell or electric vehicles may determine an upward slope using a slope angle sensor (G-sensor) or a rolling-back determination algorithm, and may increase motor torque according to the above determination result. However, in a typical creep torque control method for preventing a vehicle from rolling back on an upward slope, the vehicle frequently moves back or suddenly rushes forward because of various factors, and thus there is much room for improvement in terms of sensitivity. Also, the method is limited in that a countermeasure against malfunction of a sensor is not been addressed.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a technique for controlling creep torque, which can efficiently prevent rolling-back of an electric vehicle using an electric motor as a driving source when the electric vehicle is ascending a slope.

In one aspect, the present invention provides a system and a method for controlling creep torque to prevent an electric vehicle from rolling backward on an upward slope. More specifically, the technique calculates, in real-time, a gradient of a driving road from a detection value of a G-sensor and vehicle acceleration. A maximum creep torque for preventing rolling-back caused by gravity is then calculated according to the gradient using the gradient and vehicle information. In doing so, a first creep torque reference is calculated according to a vehicle speed based on the maximum creep torque and the vehicle speed and a second creep torque reference is calculated according to vehicle acceleration based on the maximum creep torque and the vehicle acceleration. Then, a torque command value is calculated according to an operation state of a brake based on the first creep torque reference value and the second creep torque reference value, and the measured gradient. Based on these calculations a creep torque is generated by controlling a torque output of a driving motor according to the calculated torque command value.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
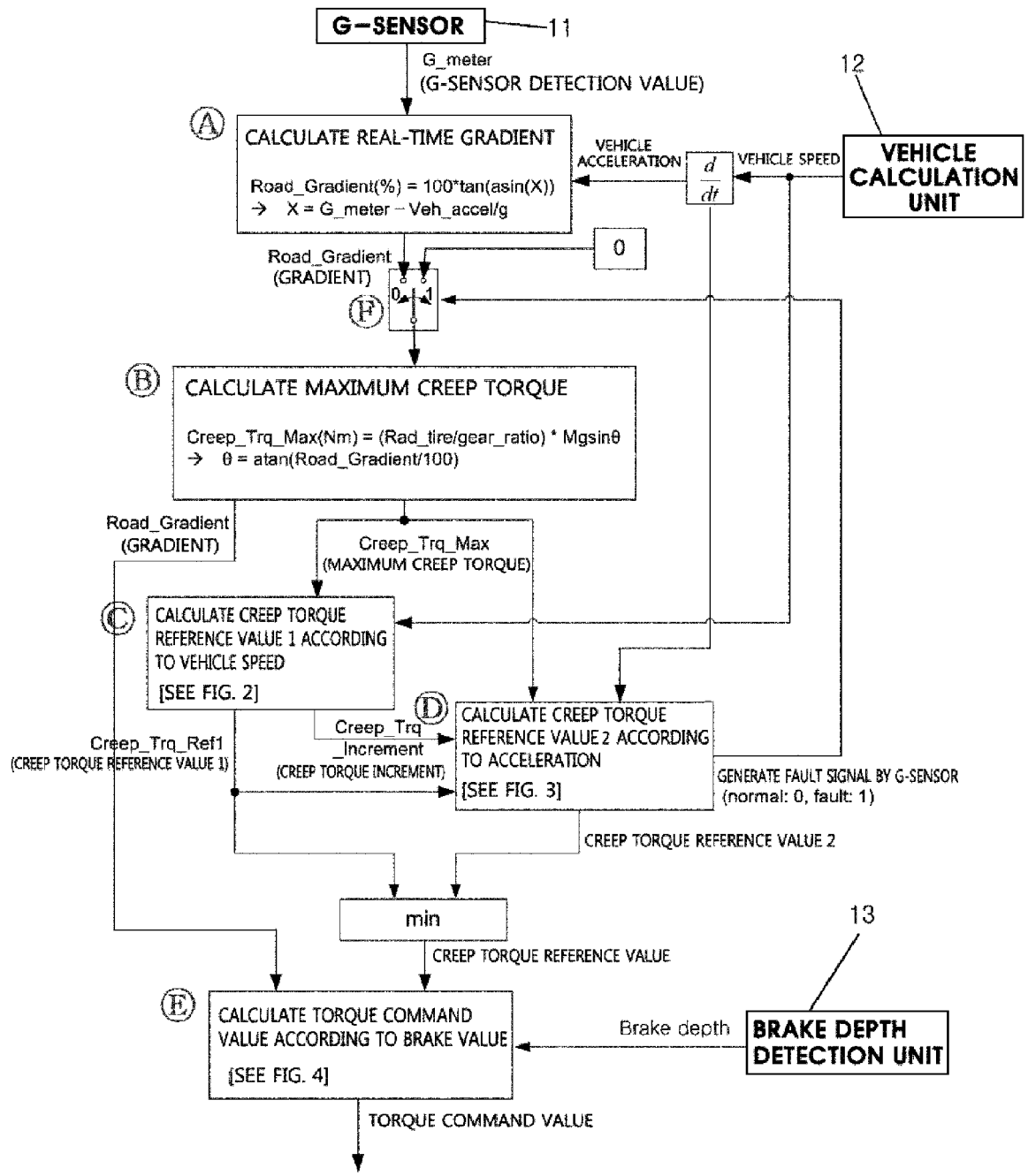
FIG. 1 is a flowchart illustrating a process of controlling creep torque according to an exemplary embodiment of the present invention.

Reference numerals set forth in the Drawings includes reference to the following elements as further discussed below:

11: G-sensor
12: vehicle speed calculation unit
13: brake depth detection unit It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings so that a person skilled in the art can readily carry out the invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The present invention relates to a method for controlling creep torque, which can efficiently prevent initial roll-back of a fuel cell vehicle and a pure electric vehicle using an electric motor as a driving source.

Figure 2:
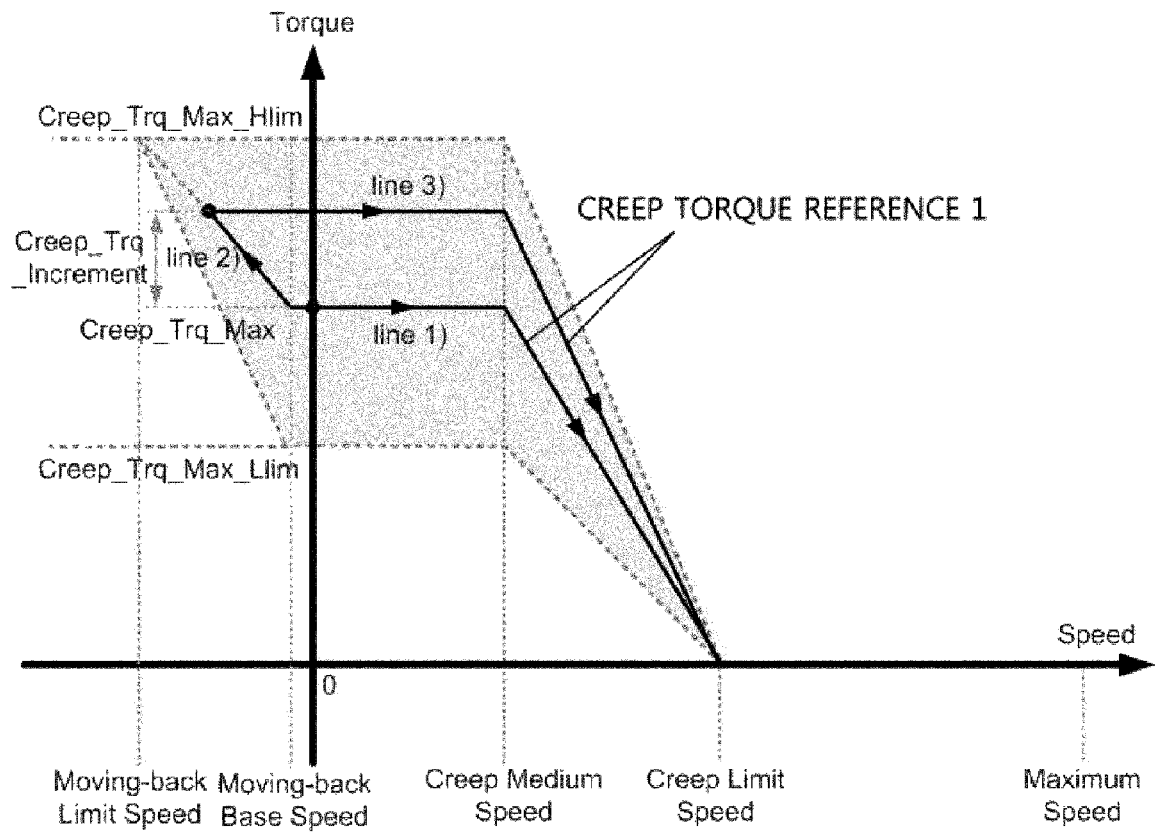
FIGS. 2 through 4 are diagrams illustrating an exemplary map used in a process of controlling creep torque according to an embodiment of the exemplary present invention.
Figure 3:
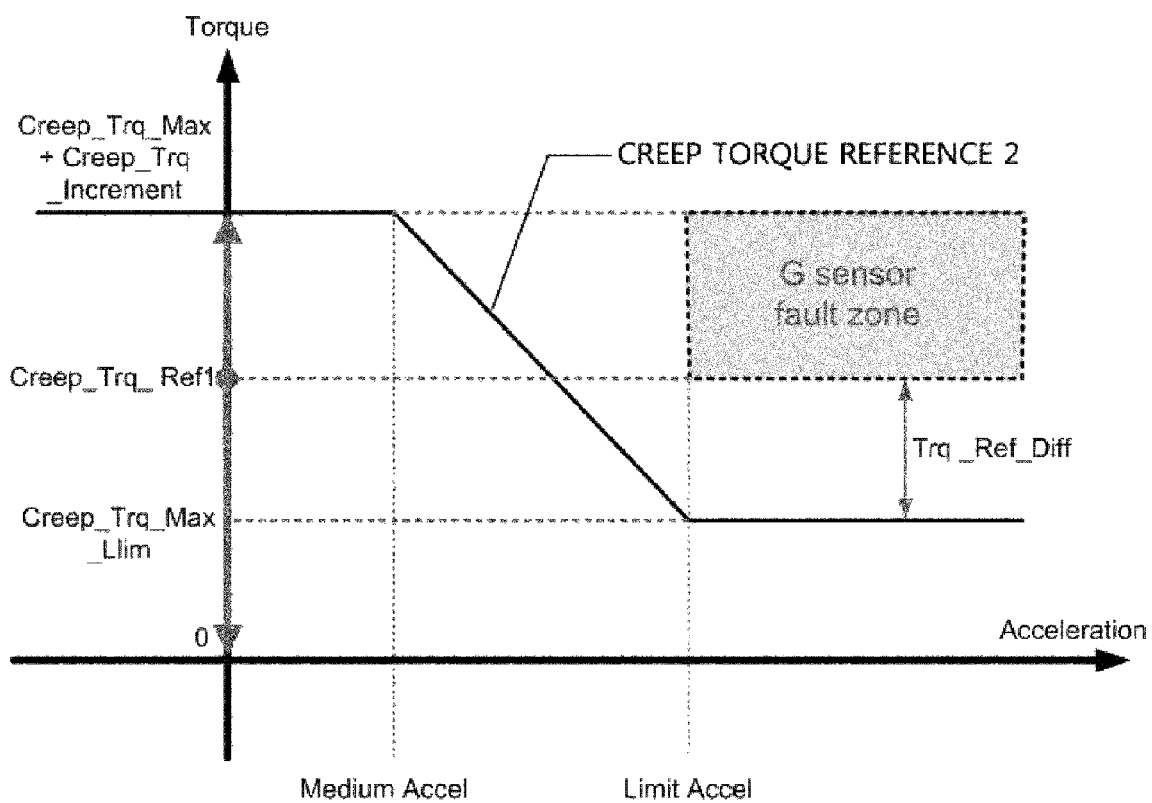
Figure 4:
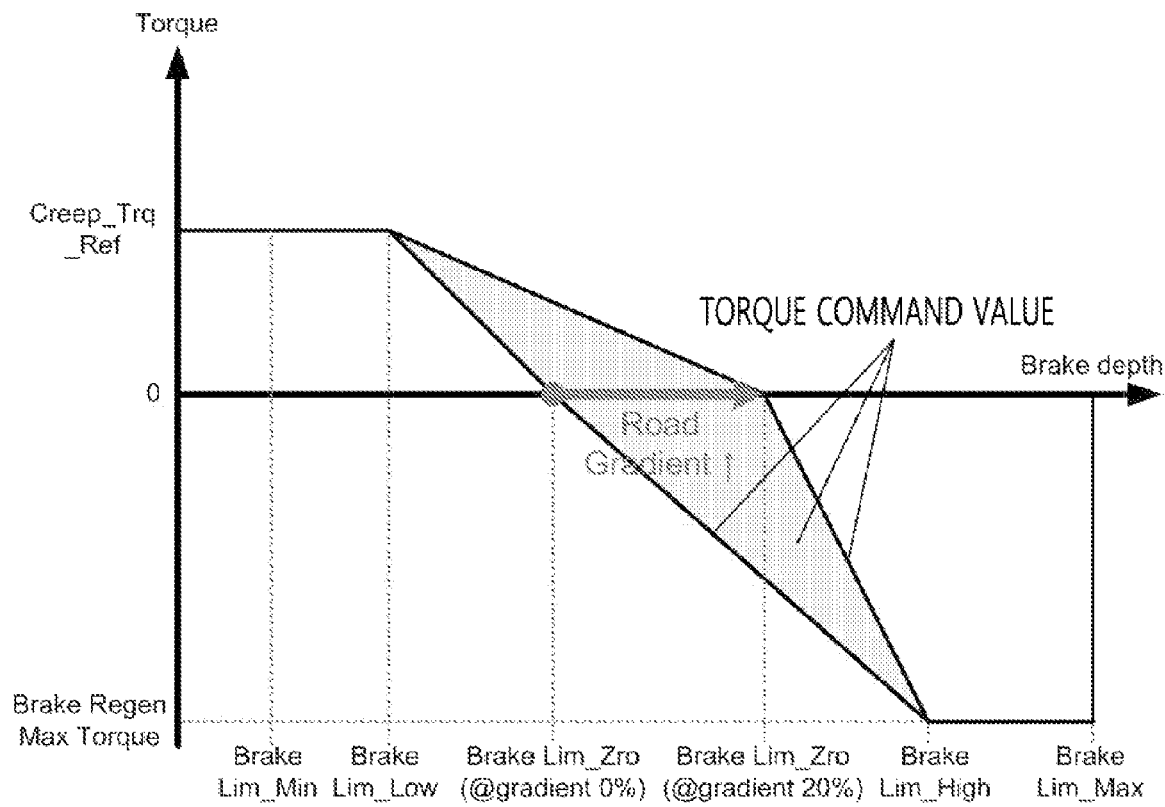
Figure 5:
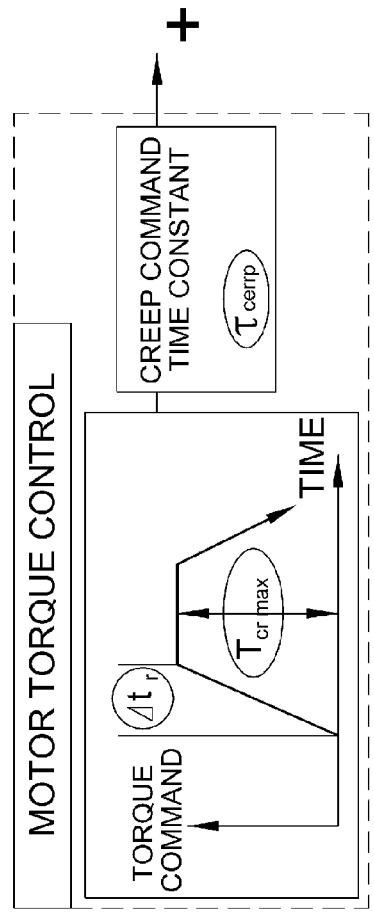
FIG. 5 is a diagram illustrating an exemplary application of a typical slope angle sensor and rolling-back determination algorithm.
Figure 5:
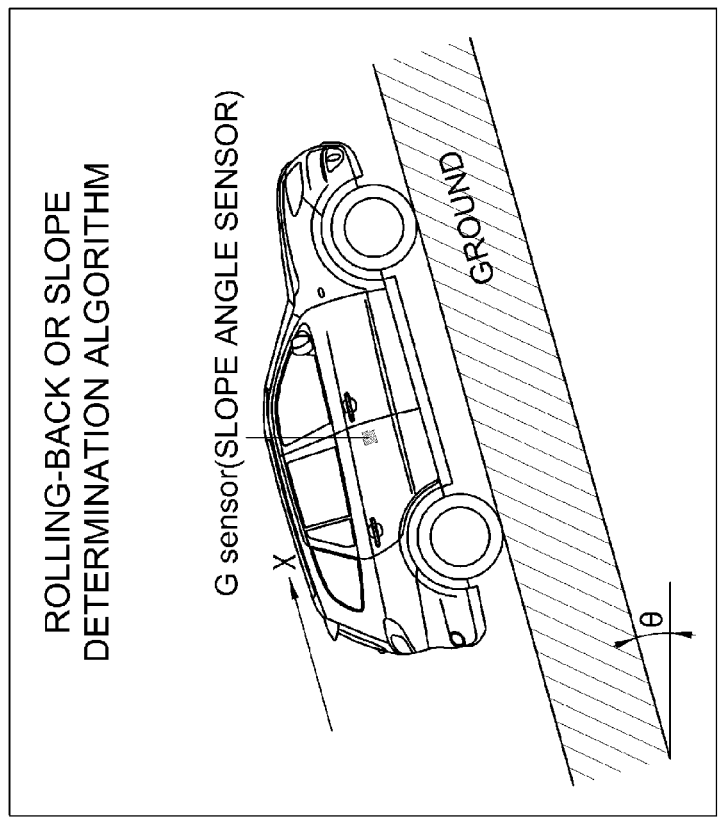
Figure 6:
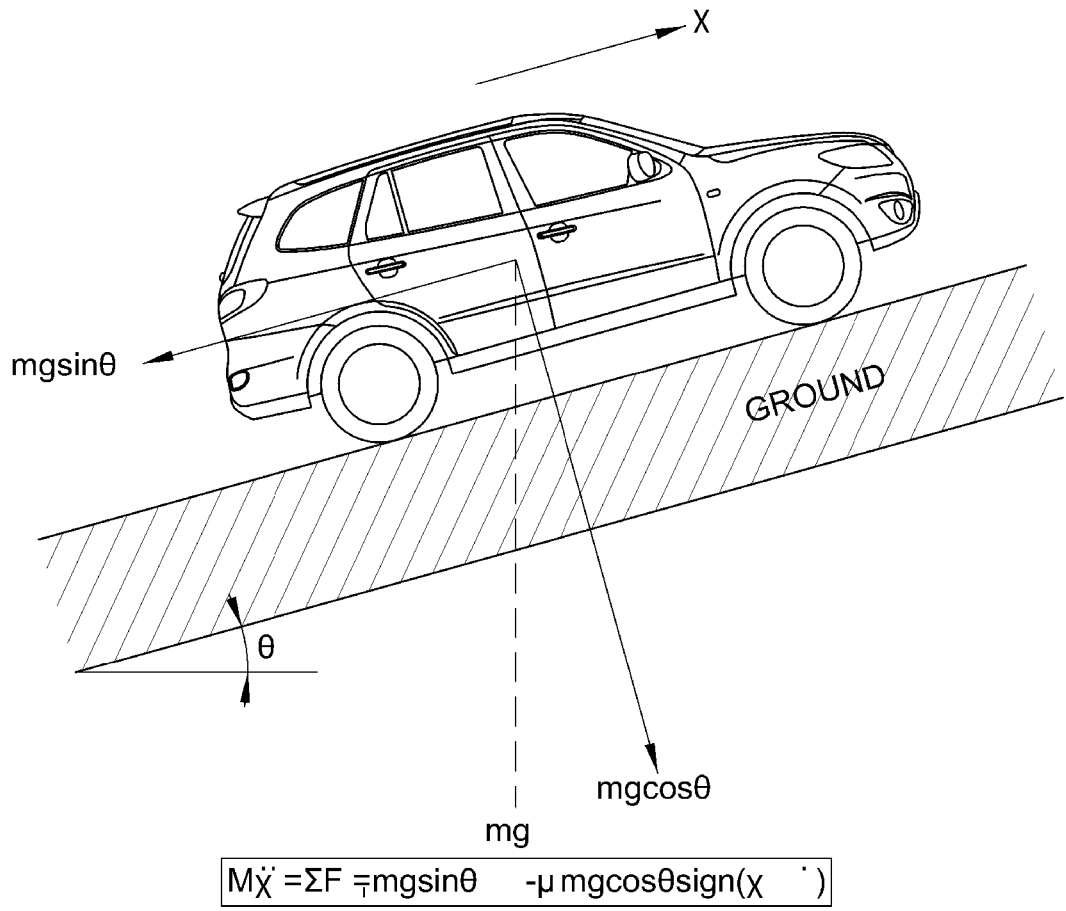
FIG. 6 is a diagram illustrating a vehicle undergoing a slope resistance when the vehicle ascends a slope.

FIG. 1 is a flowchart illustrating a process of controlling creep torque according to an embodiment of the present invention. FIGS. 2 through 4 are diagrams illustrating an exemplary map used in a process of controlling creep torque according to an embodiment of the present invention.

Advantageously, the present invention has the following features: 1) initial rolling-back can be improved even on a steep slope by utilizing real-time estimation of a gradient of a vehicle using a G-sensor and calculating an appropriate creep torque command value according to the gradient; 2) the rolling-back can be efficiently improved by increasing torque upon recognition of roll-back through control of the creep torque according to the speed of the vehicle; 3) sudden acceleration of the vehicle due to excessive creep torque can be prevented by controlling the creep torque according to the acceleration of the vehicle; and 4) excessive generation of the creep torque can be prevented through an emergency operation by determining a failure of the G-sensor and informing a driver of the failure.

Illustratively, a device configuration used in the process of controlling creep torque according to an embodiment of the present invention, as shown in FIG. 1, may include a sensor 11 installed in a vehicle; a vehicle speed calculation unit 12 for calculating the speed of the vehicle; a brake depth detection unit 13 for detecting a brake depth according to operation of a brake pedal; a controller for calculating a real-time gradient based on the detected values of the sensor 11 and the vehicle speed calculation unit 12, calculating a maximum creep torque, calculating a creep torque reference value according to the speed and acceleration of the vehicle, calculating a torque command value according to the operation of the brake pedal, and controlling torque of a driving motor using the calculated torque command value; and a warning unit (not shown) for warning a driver of a failure of the G-sensor when it is determined that G-sensor is out of order.

Here, the vehicle calculation unit 12 is configured to calculate a current speed of the vehicle in real-time from the gear ratio and the RPM of the motor outputted from a motor RPM sensor at the side of the driving motor. Also, the brake depth detection unit 13 may be configured to output a signal according to the brake depth of a typical electronic brake used in an electric vehicle.

Referring again to FIG. 1, the method for controlling creep torque according to an embodiment of the present invention illustratively includes calculating in real-time a gradient of a driving road based on a detected value of a sensor (e.g., a G-sensor) and an acceleration of a vehicle; calculating a maximum creep torque for preventing rolling-back by gravity corresponding to the gradient using the real-time calculated gradient and vehicle information; calculating a first creep torque reference value according to the speed of the vehicle based on the maximum creep torque and the speed of the vehicle; calculating a second creep torque reference value according to the acceleration of the vehicle based on the maximum creep torque and the acceleration (obtained from the speed of the vehicle) of the vehicle; calculating a torque command value according to the operation state of the brake based on the first creep torque reference value 1, the second creep torque reference value 2, and the gradient; and generating a creep torque by controlling a torque output of a driving motor according to the calculated torque command value.

In the step of calculating in real-time the gradient of the driving road, the gradient of the driving road may be calculated in real time using the detected value of the G-sensor and the acceleration of the vehicle, and the acceleration of the vehicle may be obtained by differentiating the speed of the vehicle obtained by the vehicle speed calculation unit (e.g., by using a differentiator).

The road gradient can be expressed as Equation (1).

$$\text{Road\_Gradient}(\%)=100\times\tan(a\sin(X)), X=G\_\text{meter}-\text{Veh\_accel}/g \qquad (1)$$

where Road_Gradient (%) denotes the gradient of the driving road, and G_meter denotes the value detected by the G-sensor. Also, Veh_accel denotes the acceleration of the vehicle that is obtained from the speed of the vehicle, and g denotes the acceleration of gravity.

In the step of calculating the gradient, the acceleration of X-Z direction of the vehicle can be measured using the G-sensor installed in the vehicle. The gradient Road_Gradient (%) of the driving road can be calculated in real time through Equation (1) using the detection value G_meter of the G-sensor and the acceleration Veh_accel of the vehicle.

Next, in the step of calculating the maximum creep torque, the real-time calculated gradient and the vehicle information may be used. The vehicle information may include for example a tire dynamic radius, a gear ratio, and a complete vehicle curb weight. In this case, the maximum creep torque can be expressed as Equation (2).

$$\text{Creep\_Trq\_Max}(Nm)=(\text{Rad\_tire}/\text{gear\_ratio})\times Mg\sin\theta, \theta=a\tan(\text{Road\_Gradient}/100) \quad (2)$$

where Creep_Trq_Max denoted the maximum creep torque, and Rad_tire denotes the tire dynamic radius. Also, gear_ratio denotes the gear ratio, and M denotes the complete vehicle curb weight.

When the maximum creep torque Creep_Trq_Max is calculated, the first creep torque reference Creep_Trq_Ref1 may be calculated according to the speed of the vehicle Veh_speed. In this case, the creep torque-vehicle speed map shown in FIG. 2 may be used.

That is, the first creep torque reference value 1 according to the speed of the vehicle may be extracted from the creep torque-vehicle speed of FIG. 2 using input of the maximum creep torque and the speed of the vehicle. The map illustrated in FIG. 2 illustrates lines representing the creep torque reference value 1 according to the speed of the vehicle at a specific maximum creep torque.

In FIG. 2, when roll-back does not occur, the creep torque reference value 1 may be to determined along line 1. When roll-back occurs, however, (vehicle speed<Moving_back Base Speed), the creep torque reference value 1 may be determined along line 2. In this case, the map is set such that a creep torque increment Creep_Trq_Increment is reflected according to the maximum creep torque and the vehicle speed. Here, Moving_back Base Speed is for discriminating a speed section in which the creep torque increment Creep_Trq_Increment is reflected. In a state of a (−) vehicle speed (rolling-back state) smaller than Moving_back Base Speed, a creep torque increment may occur.

Also, the creep torque increment (value determined according to the maximum creep torque and the vehicle speed) obtained from the map in FIG. 2 may be utilized in calculating the second creep torque reference value 2 as described in FIG. 1.

When the acceleration of the vehicle changes into a positive value, the first creep torque reference value 1 may be determined along line 3 in which a current value reflecting the creep torque increment is maintained until a creep medium speed is reached.

In a section between line 2 and line 3, the sum of the maximum creep torque and the creep torque increment becomes the first creep torque reference value 1.

In the map of FIG. 2, as the vehicle speed increases from the creep medium speed, the first creep torque reference value 1 is set smaller.

When the first creep torque reference value 1 is calculated, the second creep torque reference value Creep_Trq_Ref2 may be calculated according to the vehicle speed Veh_accel. In this step, a creep torque-acceleration map shown in FIG. 3 may be used. FIG. 3 illustrates a line representing the second creep torque reference value 2 at a specific maximum creep torque.

That is, the second creep torque reference value 2 according to the acceleration of the vehicle may be extracted from the creep torque-vehicle acceleration map of FIG. 3 through input of the maximum creep torque, the vehicle acceleration, and the creep torque increment obtained from the map of FIG. 2.

Since a section (section of line 3 in the map of FIG. 2) in which the creep torque increment is reflected in the step of calculating the first creep torque reference value 1 exists in the creep torque-vehicle acceleration map of FIG. 3, the second creep torque reference value 2 may be determined such that the creep torque increment Creep_Trq_Increment is reflected as the same value in a section (acceleration<Medium Accel) corresponding to the above section. In this section, the sum of the maximum creep torque and the creep torque increment may become the second creep torque reference value 2.

In a state where the vehicle acceleration is equal to or greater than the medium acceleration in the map of FIG. 3, as the vehicle acceleration increases, the second creep torque reference value 2 may get smaller.

In a state where the first creep torque reference value 1 and the second creep torque reference value 2 are calculated, when the vehicle acceleration is equal to or greater than a predetermined limit acceleration Limit Accel, and a value obtained by subtracting the second creep torque reference value 2 from the first creep torque reference value 1 is equal to or greater than a predetermined reference value Trq_Ref_Diff ((Creep_Trq_Ref1−Creep_Trq_Ref2)≥Trq_Ref_Diff), it may be determined that the G-sensor is faulty.

That is, since the maximum creep torque may be calculated based on the detection value of the G-sensor, and both the first creep torque reference value 1 and the second creep torque reference value 2 are calculated based on the maximum creep torque, if a difference between the two value is equal to or greater than the predetermined reference value Trq_Ref_Diff, it may be determined that the G-sensor is faulty. In this case, the controller may operate the warning unit to inform the driver of the G-sensors faulty state.

When the G-sensor is faulty, the emergency operation that does not depend on the gradient may be performed. In this case, the driving motor may be controlled to output the same creep torque as on a flat surface, using a creep torque value, which is considered as a flat and does not reflect the gradient by considering the gradient to be about 0%, as a torque command value. The emergency operation may prevent excessive generation of the creep torque when the G-sensor is out of order.

As described above, the first creep torque reference value 1 and the second creep torque reference value 2 are calculated, and then the minimum value of the two reference values 1 and 2 is finally set as a creep torque reference value Creep_Trq_Ref. Then, through the input of the creep torque reference value, the brake depth (i.e., brake value), and the road gradient, a torque command value Trq_Cmd according to the brake depth may be calculated from a brake depth-torque map (illustrating lines representing a torque command value at a specific creep torque reference value) of FIG. 4.

In the brake depth-torque map of FIG. 4, the brake operation depth (Brake_Lim_Zro) in which the creep torque is released (i.e., creep torque equals to about zero) when the brake pedal is depressed may be set to vary according to the road gradient. Thus, when the brake pedal is depressed on an upward slope, the roll-back of the vehicle caused by early release of the creep torque can be prevented. For example, the brake depth at which the creep torque is released may be set greater as the road gradient increases from about 0% to about 20%. Then, the controller may control the toque output of the driving motor according to the calculated torque command value to generate a creep torque.

According to the embodiment of the present invention, the gradient of the driving road can be calculated in real time, and the maximum creep torque can be calculated from the calculated gradient. Also, the first creep torque reference value 1 in accordance with the vehicle speed and the second creep torque reference value 2 in accordance with the vehicle acceleration may be calculated, and then the torque command value may be calculated according to the creep torque reference value that is the minimum value of the two reference values 1 and 2 and the brake depth to proceed to the step of generating the creep torque. Thus, the initial roll-back of the electric vehicle can be efficiently prevented.

Also, through the step of comparing the first creep torque reference value 1 according to the vehicle speed with the second creep torque reference value 2, it can be determined whether the G-sensor is faulty. If the G-sensor is faulty, excessive generation of the creep torque can be prevented through the emergency operation (fix creep torque to a gradient of about 0%).

According to a method for controlling creep torque to prevent a vehicle from rolling backward on an upward slope, it is possible to efficiently prevent initial rolling-back of the vehicle when the vehicle climbs the slope. Also, the sensitivity of the overall system is increased thereby preventing sudden acceleration by the vehicle due to excessive creep torque.

In addition, it is possible to detect a failure of a G-sensor and inform a driver of its failure state, and prevent excessive generation of creep torque through an emergency operation.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for controlling creep torque to prevent a vehicle using an electric motor as a driving source from rolling backward on an upward slope, the method comprising:
    calculating, by an electric motor controller, in real-time, a gradient of a driving road from a detection value of a sensor and vehicle acceleration;
    calculating, by the electric motor controller, a maximum creep torque for preventing rolling-back caused by gravity according to the gradient using the gradient and vehicle information;
    calculating, by the electric motor controller, a first creep torque reference according to a vehicle speed based on the maximum creep torque and the vehicle speed;
    calculating, by the electric motor controller, a second creep torque reference according to vehicle acceleration based on the maximum creep torque and the vehicle acceleration;
    calculating, by the electric motor controller, a torque command value according to an operation state of a brake based on the first creep torque reference value and the second creep torque reference value, and the gradient; and
    generating, by the electric motor controller, a creep torque by controlling a torque output of a driving motor according to the calculated torque command value,
    wherein calculating the first creep torque reference value includes calculating the first creep torque reference value from a creep torque-vehicle speed map representing a relation between the maximum creep torque and the vehicle speed,
    wherein in the creep torque-vehicle speed map, a creep torque increment to be applied to a vehicle speed section in which rolling-back of the vehicle occurs and a vehicle speed section to a predetermined creep medium speed in a state where the vehicle acceleration changes into a positive (+) value is set to a value according to the maximum creep torque and the vehicle speed,
    wherein the step of calculating the torque command value comprises finally determining a minimum value of the first creep torque reference value and the second creep torque reference value as a creep torque reference value, and calculating a torque command value according to a brake depth from a brake depth-torque map representing a relation among the creep torque reference value, the brake depth, and the gradient, and
    wherein the brake depth-torque map is set such that the brake depth at which the creep torque is released (creep torque equals to 0) when a brake pedal is depressed varies according to the gradient.

2. The method of claim 1, wherein the step of calculating the second creep torque reference value comprises calculating the second creep torque reference value according to the vehicle acceleration from a creep torque-vehicle acceleration map representing a relation of the maximum creep torque and the vehicle acceleration.

3. The method of claim 2, wherein, in the creep torque-vehicle acceleration map, a creep torque increment to be applied to a section of vehicle acceleration smaller than a predetermined medium acceleration is set, and in the section of the vehicle acceleration smaller than the predetermined medium acceleration, the second creep torque reference value is obtained from a sum of the maximum creep torque and the creep torque increment, 4. The method of claim 3, wherein the creep torque increment is obtained according to the maximum creep torque and the vehicle speed from the creep torque-vehicle speed map for calculating the first creep torque reference value, 5. The method of claim 1, further comprising determining whether an G-sensor is faulty based on the first creep torque reference value 1 and the second creep torque reference value 2, and the vehicle acceleration and operating a warning unit to inform of a fault state.

6. The method of claim 5, wherein, if the vehicle acceleration is equal to or greater than a predetermined limit value, and a difference between the first creep torque reference value and the second creep torque reference value is equal to or greater that a predetermined reference value, the G-sensor is determined as faulty.

7. The method of claim 6, wherein, when the G-sensor is faulty, an emergency operation that generates a creep torque of the driving motor is performed using a creep torque value considered as a flat having a gradient of about 0 percent as a torque command value.

8. The method of claim 1, wherein the brake depth at which the creep torque is released is set greater as the gradient increases.

* * * * *